US009139379B2

(12) United States Patent
Gawelczyk et al.

(10) Patent No.: US 9,139,379 B2
(45) Date of Patent: Sep. 22, 2015

(54) CARRYING BELT CONVEYOR AND CONVEYOR ARRANGEMENT HAVING A CARRYING BELT CONVEYOR OF THIS TYPE

(75) Inventors: Klaus Gawelczyk, Reutlingen (DE); Martin Waeder, Weil im Schoenbuch (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 13/367,536

(22) Filed: Feb. 7, 2012

(65) Prior Publication Data
US 2012/0199444 A1 Aug. 9, 2012

(30) Foreign Application Priority Data

Feb. 7, 2011 (DE) .......................... 10 2011 010 544

(51) Int. Cl.
*B65G 47/64* (2006.01)
*B61B 13/04* (2006.01)
*B65G 1/04* (2006.01)

(52) U.S. Cl.
CPC .............. *B65G 47/642* (2013.01); *B61B 13/04* (2013.01); *B65G 1/04* (2013.01)

(58) Field of Classification Search
CPC ........ B65G 35/06; B65G 47/642; B65G 1/04; B65G 47/641; B65G 47/647; B65B 13/04
USPC ........................................................ 198/570
See application file for complete search history.

(56) References Cited

U.S. PATENT DOCUMENTS 4,715,766 A * 12/1987 Gebhardt ..................... 414/392
4,852,718 A * 8/1989 Kunstmann ................ 198/465.3
5,658,120 A * 8/1997 Watanabe ...................... 414/495
6,554,127 B1 * 4/2003 Kroll ........................ 198/465.4
7,559,282 B2 * 7/2009 Austin ............................ 105/141
8,047,756 B2 * 11/2011 Tuffs et al. .................... 414/392
8,336,701 B2 * 12/2012 Ruggaber et al. .......... 198/345.3
2003/0221935 A1 * 12/2003 Barklin et al. ................ 198/357
2006/0060446 A1    3/2006 Springmann
2008/0251354 A1 * 10/2008 Ruggaber et al. .......... 198/463.1

FOREIGN PATENT DOCUMENTS

| AT | 404 463 B | 11/1998 |
|---|---|---|
| DE | 1 840 594 U | 11/1961 |
| DE | 67 52 558 U | 2/1969 |
| DE | 10 2004 045 517 A1 | 4/2006 |
| EP | 0 114 343 A1 | 8/1984 |

\* cited by examiner

*Primary Examiner* — Gene Crawford
*Assistant Examiner* — Thomas Randazzo
(74) *Attorney, Agent, or Firm* — Factor Intellectual Property Law Group, Ltd.

(57) ABSTRACT

A carrying belt conveyor for conveying material which includes a rail system having at least one floor-based carrying rail. There is at least one transport car which may be moved in a transport direction on the carrying rail and which includes a travel mechanism having a travel unit which leads in the transport direction and a travel unit which follows in the transport direction, the travel units are connected by a frame structure and are each guided by the carrying rail. The transport car also includes a carrying device for material to be conveyed. The frame structure of the travel mechanism forms the carrying device and is in turn constructed as a conveyor device by means of which material to be conveyed is moved relative to the travel mechanism of the transport car at an angle to the transport direction.

13 Claims, 4 Drawing Sheets

CARRYING BELT CONVEYOR AND CONVEYOR ARRANGEMENT HAVING A CARRYING BELT CONVEYOR OF THIS TYPE

RELATED APPLICATIONS

This application claims priority to German Patent Application No. 10 2011 010 544.1 filed on Feb. 7, 2011, the entirety of which is incorporated herein by reference as if fully set forth herein.

TECHNICAL FIELD AND BACKGROUND OF THE INVENTION

The invention relates to a carrying belt conveyor for conveying material to be conveyed, in particular loaded pallets, having a rail system which comprises at least one floor-based carrying rail, at least one transport car which may be moved in a transport direction on the carrying rail, and which comprises a travel mechanism having a travel unit which leads in the transport direction and a travel unit which follows in the transport direction, which travel units are connected by a frame structure and are guided in each case by the carrying rail, and which further comprises a carrying device for material to be conveyed.

The invention moreover relates to a conveyor arrangement for conveying material to be conveyed, which comprises a carrying belt conveyor and at least one further conveyor system.

Carrying belt conveyors of the type mentioned at the outset are frequently used in conveyor arrangements which, in addition to the carrying belt conveyor, comprise further conveyor systems which operate on a principle which deviates from the carrying belt conveyor. Thus, for example, in addition to the carrying belt conveyor, the conveyor arrangement can also include roller conveyors, carrying-chain conveyors or comparable conveyors operating with continuous drive means or the like.

Consequently, in order to move the material to be conveyed and therefore, for example, loaded or possibly also unloaded pallets through the entire conveyor arrangement by means of a plurality of intrinsically independent conveyor systems, the material to be conveyed has to be transferred from the carrying belt conveyor to a conveyor system of a different design at a given time on its path through the conveyor arrangement.

To this end, in the commercially known carrying belt conveyors of the type mentioned at the outset, a separate conveyor device or transfer unit, e.g. a roller conveyor module, a carrying-chain conveyor module or comparable conveyor modules or, for example, a telescopic unit, which receives the material to be conveyed during its transportation through the carrying belt conveyor, is constructed on the frame structure. However, a design of this type calls for a relatively tall construction in relation to the level of the floor and a correspondingly high transportation level for the material to be conveyed.

However, in floor-based conveyor systems, the overall heights realised are generally as low as possible to eliminate the need for supporting structures which have a high material requirement and are therefore expensive. This means that the further conveyor systems often transport the material to be conveyed at a lower level than the carrying belt conveyors of the type mentioned at the outset.

It is therefore either necessary to design suitable transfer devices which transfer the material to be conveyed from the carrying belt conveyer to another conveyor system. However, this results in a relatively low capacity of the conveyor arrangement since the increased complexity involved in conveying the material to be conveyed causes time to be lost. Moreover, separate transfer devices increase both the installation costs and the operating costs of the arrangement.

Alternatively all the conveyor systems of a conveyor arrangement which operate together have to be adapted to one another so that the material to be conveyed is conveyed at the same level by all the different conveyor systems. However, when using commercially known carrying belt conveyors, this means that the other conveyor systems have to be "jacked up", as it were, which likewise drives costs upwards.

An object of the invention, therefore, is to provide a carrying belt conveyor and a conveyor arrangement of the type mentioned at the outset such that they each meet these concerns.

SUMMARY OF THE INVENTION

This object may be achieved in a carrying belt conveyor of the type mentioned at the outset in that the frame structure of the travel mechanism forms the carrying device and is in turn constructed as a conveyor device by means of which material to be conveyed may be moved relative to the travel mechanism of the transport car at an angle to the transport direction.

According to an embodiment of the present invention, therefore, the frame structure of the travel mechanism at the same time forms a conveyor device which can be used as a transfer unit for transferring the material to be conveyed to another conveyor system. The conveying technology is therefore integrated in the frame structure and therefore in the travel mechanism of the transport car. In other words, a conveyor device is used as a component of the travel mechanism of the transport car. Since it is thus possible to dispense with a separate construction of a conveyor device or transfer unit on the frame structure, the transportation level of the material to be conveyed can be lower than with a separate construction of this type.

If the conveyor device is constructed in a different manner to the carrying belt conveyor, this can be used particularly efficiently in conveyor arrangements of the type mentioned at the outset.

Constructing the conveyor device in the manner of a roller conveyor or a carrying-chain conveyor has proven favourable and particularly easy to implement.

In terms of current transportation heights for material to be conveyed using established conveying techniques, it is particularly advantageous if the frame structure is constructed in such a way that the transportation height for the material to be conveyed is between 250 mm and 1000 mm in relation to the level of the floor, preferably between 400 mm and 750 mm, more preferably between 550 mm and 650 mm and particularly preferably 550 mm. Many commercially known roller conveyors operate in particular at a transportation height of 550 mm. The resultant transportation height here is particularly dependent on the design of the transport rail, the overall height of which limits the minimum achievable transportation height.

For simple transfer of the material to be conveyed from the transport car to another conveyor system, it is advantageous if the angle to the transport direction at which material to be conveyed may be moved relative to the travel mechanism of the transport car is up to 90°.

It is favourable here if the angle to the transport direction at which material to be conveyed may be moved relative to the travel mechanism of the transport car is 30° or 45° or 60° or 90°. An angle of 90° is particularly preferable here so that the material to be conveyed can be delivered to another conveyor system perpendicularly to the transport direction of the carrying belt conveyor.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the following drawings.

DETAILED DESCRIPTION OF THE PRESENT INVENTION

Figure 1:
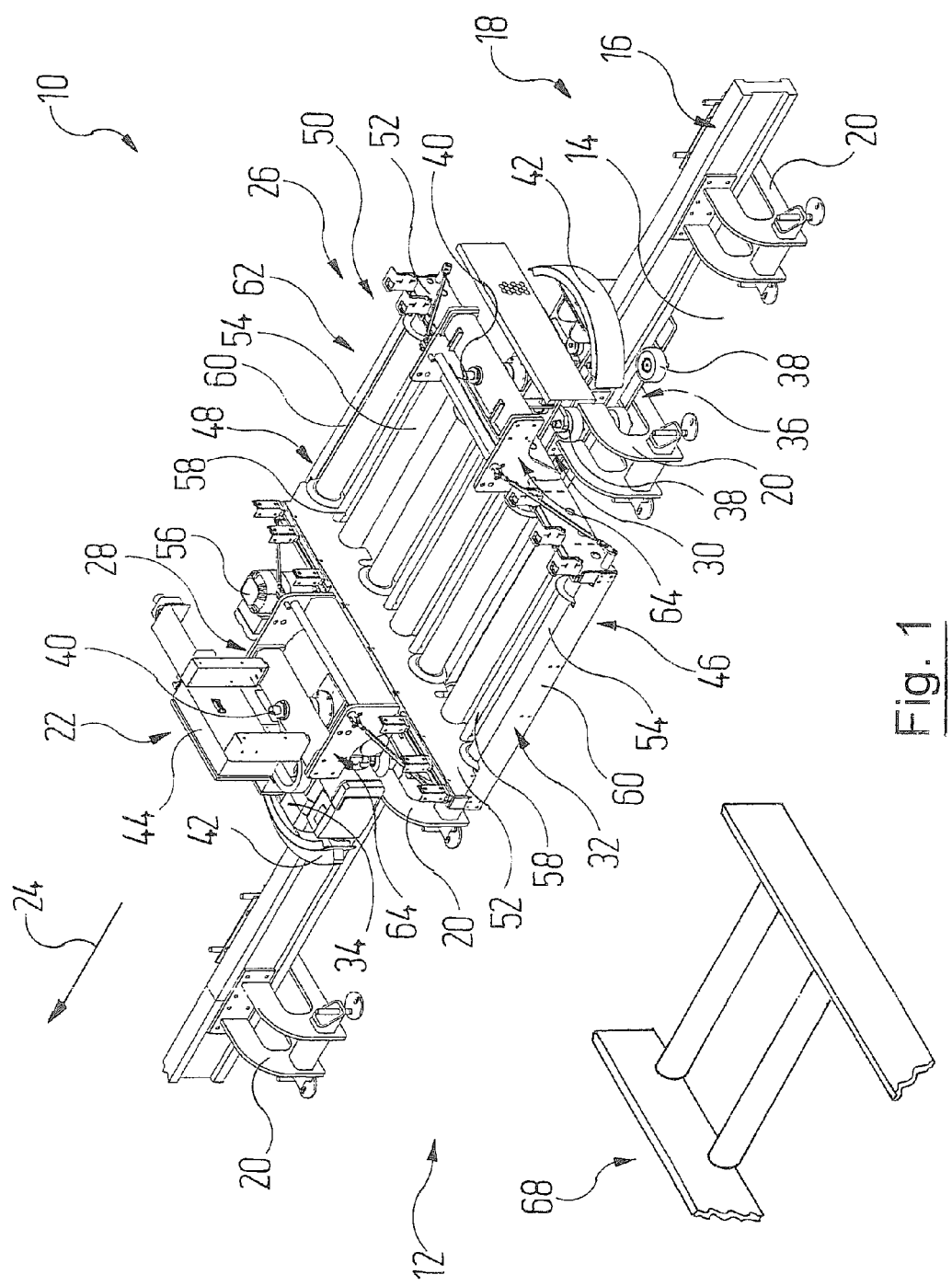
FIG. 1 is a perspective view of a detail of a low belt conveyor with a carrying rail of a rail system on which a transport car runs.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, 10 denotes a conveyor arrangement as a whole for conveying material to be conveyed, which is in the form of loaded pallets, for example, as known per se. A detail of a carrying belt conveyor 12 included in the conveyor arrangement 10 is shown, in which carrying rails 16 extending along the floor 14 form a rail system 18. The carrying rails 16 are fixed to the floor 14 by way of brackets 20 and have a profile which is I-shaped in cross-section.

The Figures show one of a plurality of transport cars 22 of the carrying belt conveyor 12 which can be moved in a transport direction 24 on the carrying rails 16. The transport car 22 comprises a travel mechanism 26 which in turn has a travel unit 28, technically known as a "front runner", which leads in the transport direction 24 and a further travel unit 30, technically known as a "rear runner", which follows in the transport direction 24, which travel units each embrace the carrying rail 16.

The travel mechanism 26 of the transport car 22 moreover comprises a frame structure 32 which connects the front runner 28 to the rear runner 30. This frame structure 32 is discussed in further detail below.

The front runner 28 and the rear runner 30 of the transport car 22 are equipped in a manner known per se with guide and carrying rollers, not all of which are denoted by a reference numeral here and which roll along different surfaces of the I-shaped profile of the carrying rail 16. Here, the carrying rollers roll along the upper side of the carrying rail 16. At least one of the rollers of the front runner 28 serves as a drive roller and, to this end, may be driven by an electric motor 34 which is carried by the front runner 28. It is also optionally possible for the rear runner 30 to have a drive roller which can be driven by an electric motor.

The transport car 22 is able to negotiate curves. To this end, the front runner 28 and the rear runner 30 each comprise an arrangement 36 of lateral guide rollers 38 which run along vertical flanks of the carrying rail 16 and of which only some are denoted by reference numerals in the Figures. Each ensemble 34 is mounted such that it is rotatable relative to the frame structure 32 about a vertical axis of rotation 40, thus enabling the transport car 22 to follow the curved path of the carrying rail 16 through a curve. The transport direction 24, whether the transport car 22 is travelling along a straight or through a curve, is always parallel to a horizontal straight line which intersects the two axes of rotation 40 of the roller ensemble 34.

Figure 4:
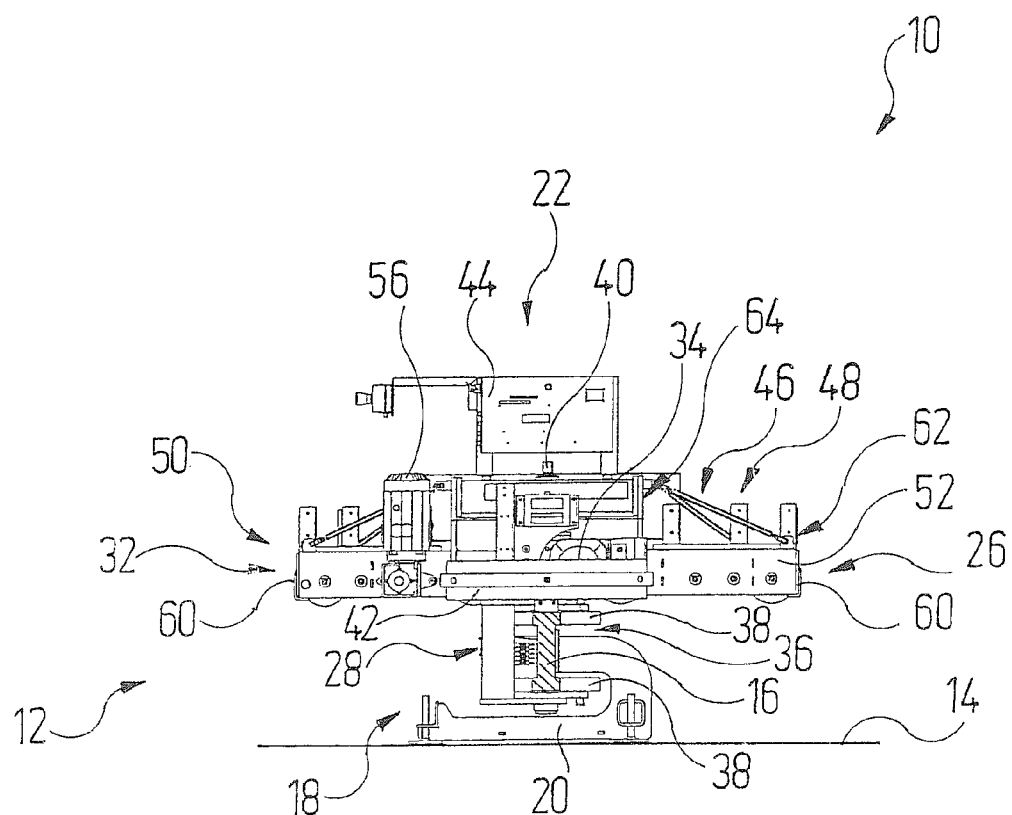
FIG. 4 is a section along the section line IV-IV in FIG. 2.
Figure 5:
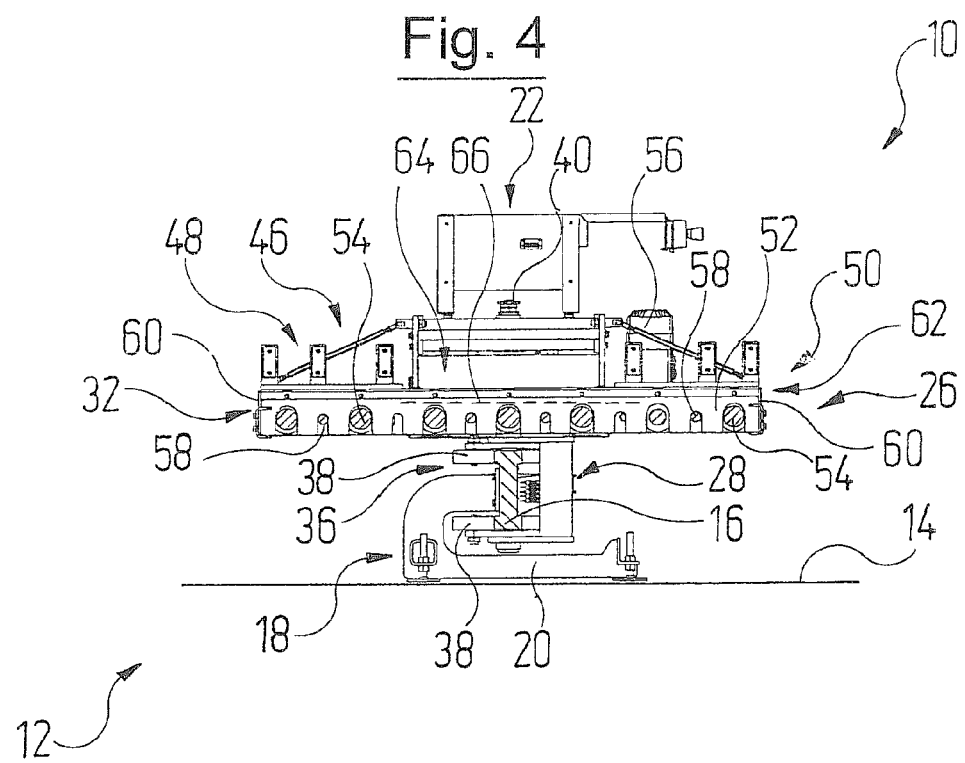
FIG. 5 is a section along the section line V-V in FIG. 2.

On the front runner 28 and the rear runner 30, the transport car 22 is equipped in a manner known per se with a sensor unit (denoted in each case by 42) which, amongst other things, enables the position of the transport car 22 on the rail system 18 and the spacing from a further transport car travelling in front or behind to be detected. The sensor units 42 cooperate with a control unit 44 which is carried by the front runner 28 and controls the electric motor 34 on the one hand and moreover communicates in likewise known manner with a central control (not shown separately) by way of which the conveying procedure is coordinated and controlled as a whole with regard to all the transport cars 22 present. The communication of the transport car 22, along with its energy supply, is effected in a manner known per se by way of contact lines extending along the carrying rail 16, which are shown in FIGS. 4 and 5 although they are not denoted by a separate reference numeral.

The above-mentioned frame structure 32 which connects the front runner 28 to the rear runner 30 forms a carrying device 46 for the material to be conveyed and is constructed as a whole as the conveyor device 48 by means of which material to be conveyed may be moved relative to the travel mechanism 26 of the transport car 22 at an angle to the transport direction 24. Conveyor technology is therefore integrated in the frame structure 32.

In this exemplary embodiment, the conveyor device 48 is constructed in a different manner to the carrying belt conveyor 12. In this exemplary embodiment, the conveyor device 48 is constructed in the manner of a roller conveyor and has a roller conveyor module 50. To this end, the frame structure 32 comprises two parallel side cheeks 52 which extend perpendicularly to the transport direction 24 and are arranged in a common horizontal plane. In a manner known per se, the side cheeks 52 support the opposite ends of rotatable conveyor rollers 54 which in turn extend parallel to the transport direction 24 and next to one another, likewise in a common horizontal plane.

In this exemplary embodiment, there are seven of such conveyor rollers 54 of which only two are denoted by reference numerals for the sake of clarity. These conveyor rollers 54 can be driven synchronously by means of an electric motor 56, the electric motor 56 being carried along by the frame structure 32. The electric motor 56 is likewise controlled by way of the control unit 44 of the front runner 28. In a modification, it is also possible for only some of the conveyor rollers 54 to be driven. In this case, the other conveyor rollers 54 move without a separate drive.

In order to stabilise the frame structure 32 in its capacity as a carrying device 46 and conveyor device 48 for the material to be conveyed, the side cheeks 52 are connected together in rigid and substantially torsion-resistant manner by connecting struts 58, which extend between the conveyor rollers 54 and of which only two have a reference numeral, and two outer connecting strips 60 simultaneously serving as screens. A roller conveyor 62 is constructed in this way.

This roller conveyor 62 is coupled to the front runner 28 and the rear runner 30 in each case by way of respective L-shaped bracket units 64 of the frame structure 32, of which in each case one is secured to the side cheeks 52. Here, each bracket unit 64 provides the associated axis of rotation 40 for the roller arrangement 36 of the front runner 28 or the rear runner 30.

Figure 2:
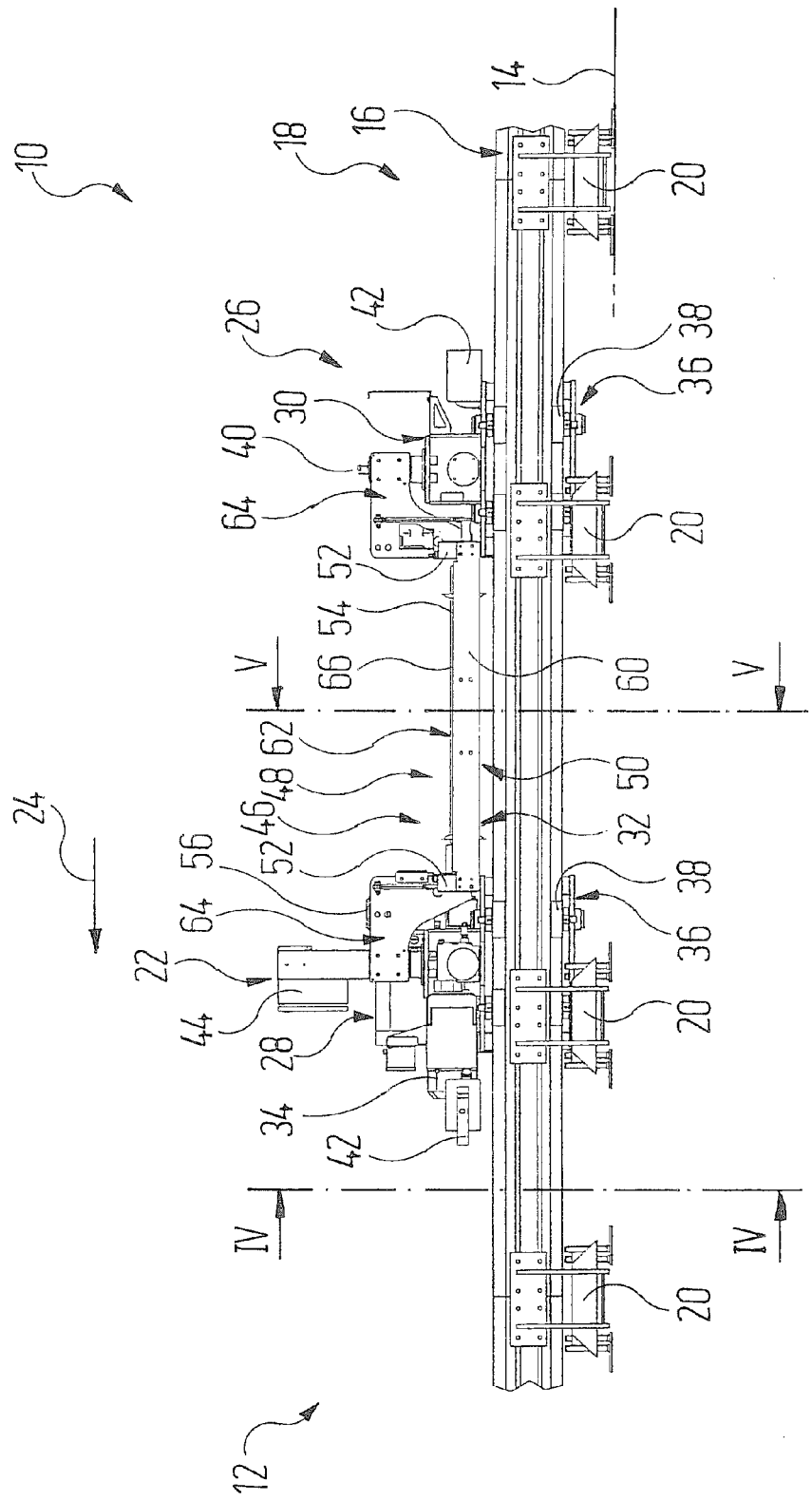
FIG. 2 is a side view of the detail of the conveyor arrangement according to FIG. 1.
Figure 3:
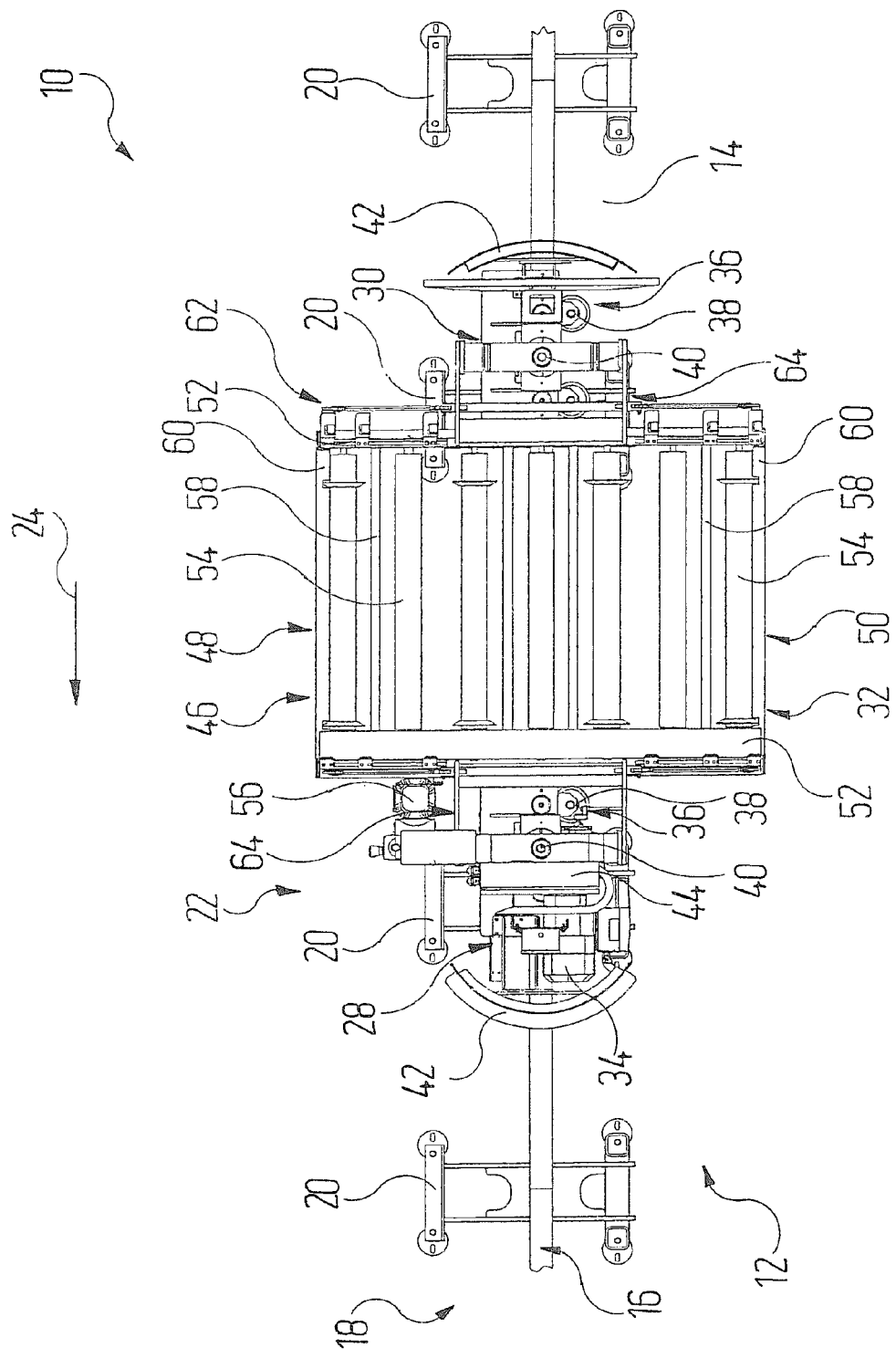
FIG. 3 is a view from above of the detail of the conveyor arrangement according to FIG. 1.

The bracket units 64 couple the roller conveyor module 50 to the front runner 28 and the rear runner 30 as a whole in such a way that the conveyor rollers 54 run over the carrying rail 16 with only a slight spacing, as clearly shown in FIGS. 2, 4 and 5.

A front plane 66 specified by the conveyor rollers 54 is only identified in FIGS. 2 and 5 and indicated in FIG. 5 by a dashed line. This conveying plane 66 defines the transportation height or, more precisely, the support height relative to the level of the floor 14, in which the material to be conveyed is supported on the roller conveyor module 50 and transported by the carrying belt conveyor 12. At the same time, the conveying plane 66 also defines the transfer height relative to the level of the floor 14 at which material to be conveyed can be transferred from the transport car 22 to a further conveyor system, which belongs to the conveyor arrangement 10 and is in turn constructed in a different manner to the carrying belt conveyor 12.

As a result of the frame structure 32, in particular as a result of the bracket units 64, this transportation height 66 or transfer height 66 can be kept particularly low. In practice, transportation heights or transfer heights which are between 250 mm and 1000 mm relative to the floor, preferably between 400 mm and 750 mm, more preferably between 550 mm and 650 mm and particularly preferably 550 m, have proven particularly favourable. A transfer height of 550 mm relative to the level of the floor has shown itself to be compatible with many types of conveyor system.

A further conveyor system of this type can be formed for example by a roller conveyor 68 as is known per se for conveying pallets and which is particularly complementary here to the roller conveyor module 50 of the transport car 22. For the sake of clarity, the roller conveyor 68 is only shown in FIG. 1, where it is also only illustrated very schematically. Deviating from the roller conveyor 68, however, other known systems such as carrying-chain conveyors or comparable conveyors which operate with continuous drive means or the like, can also cooperate with the transport car 22 and the roller conveyor module 50 carried along by this. Conveyors with continuous drive means which are comparable with carrying-chain conveyors are, for example, belt conveyors, band conveyors, strap conveyors.

In this exemplary embodiment, the material to be conveyed may be moved relative to the travel mechanism 26 of the transport car 22 at an angle of 90° to the transport direction 24. In modifications which are not shown separately, the angle can also be smaller than 90°. For this purpose, the bracket units 64 of the frame structure 32 can be constructed for example so that the side cheeks 52 and therefore the roller conveyor 62 extend at an angle other than 90° to the transport direction 24. Therefore, all angles of less than 90° are essentially possible. In addition to 90°, an angle of 30°, 45° or 60° is particularly suitable.

In a further modification which is not shown separately, the roller conveyor 62 can also be rotatably mounted on a bearing frame carried by the bracket units 64 and rotated by means of a further electric motor into different angular positions relative to the transport direction and locked in these positions.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A carrying belt conveyor for conveying material to be conveyed, comprising:
   a single-line rail system which comprises at least one floor-based single-line carrying rail which comprises exterior vertical flanks and has a profile which is I-shaped in cross-section;
   at least one transport car which is movable in a transport direction on the at least one floor-based single-line carrying rail;
   wherein the at least one transport car comprises:
   a travel mechanism having a travel unit which leads in the transport direction and a travel unit which follows in the transport direction, wherein the travel units are connected by a frame structure and are each guided by the at least one floor-based single-line carrying rail, wherein the travel units each comprise an arrangement of lateral guide rollers which run along the exterior vertical flanks of the at least one floor-based single-line carrying rail, each arrangement of lateral guide rollers being mounted such that they are rotatable relative to the frame structure about a vertical axis of rotation, and each arrangement of lateral guide rollers comprise two lateral guide rollers one behind the other in the direction of travel; and,
   a carrying device for material to be conveyed,
   wherein the frame structure of the travel mechanism forms the carrying device and is constructed as a conveyor device by means of which the material to be conveyed is moved relative to the travel mechanism of the transport car at an angle to the transport direction.

2. A carrying belt conveyor according to claim 1, wherein the conveyor device is constructed in a different manner than the carrying belt conveyor.

3. A carrying belt conveyor according to claim 1, wherein the conveyor device is a roller conveyor or a carrying-chain conveyor.

4. A carrying belt conveyor according to claim 2, wherein the conveyor device is a roller conveyor or a carrying-chain conveyor.

5. A carrying belt conveyor according to claim 1, wherein the frame structure is constructed such that a transportation height for the material to be conveyed is between 250 mm and 1000 mm in relation to the level of a floor.

6. A carrying belt conveyor according to claim 2, wherein the frame structure is constructed such that a transportation height for the material to be conveyed is between 250 mm and 1000 mm in relation to the level of a floor.

7. A carrying belt conveyor according to claim 3, wherein the frame structure is constructed such that a transportation height for the material to be conveyed is between 250 mm and 1000 mm in relation to the level of a floor.

8. A carrying belt conveyor according to claim 1, wherein the angle to the transport direction is up to 90°.

9. A carrying belt conveyor according to claim 8, wherein the angle to the transport direction is 30° or 45° or 60° or 90°.

10. A carrying belt conveyor according to claim 2, wherein the angle to the transport direction is up to 90°.

11. A carrying belt conveyor according to claim 3, wherein the angle to the transport direction is up to 90°.

12. A carrying belt conveyor according to claim 5, wherein the angle to the transport direction is up to 90°.

13. The carrying belt conveyor of claim 1 further comprising:
   at least one further conveyor system, which together with the carrying belt conveyor, form a conveyor arrangement for conveying material to be conveyed.

\* \* \* \* \*